(12) United States Patent
Dunn

(10) Patent No.: US 8,258,727 B2
(45) Date of Patent: Sep. 4, 2012

(54) REGENERATIVE TORQUE SHIFTER

(75) Inventor: Randy Dunn, City of Industry, CA (US)

(73) Assignee: International Rectifier Corporation, El Segundo, CA (US)

( * ) Notice: Subject to any disclaimer, the term of this patent is extended or adjusted under 35 U.S.C. 154(b) by 900 days.

(21) Appl. No.: 12/232,009

(22) Filed: Sep. 9, 2008

(65) Prior Publication Data
US 2009/0066273 A1    Mar. 12, 2009

Related U.S. Application Data

(60) Provisional application No. 60/935,985, filed on Sep. 10, 2007.

(51) Int. Cl.
*H02P 3/18* (2006.01)

(52) U.S. Cl. ......... 318/376; 318/432; 318/434; 318/139

(58) Field of Classification Search .................. 318/375, 318/376, 432, 434, 139, 140; 180/65.1, 65.21, 180/65.235, 65.29, 65.6, 65.7, 65.5; 903/903, 903/906, 917

See application file for complete search history.

(56) References Cited

U.S. PATENT DOCUMENTS

| | | | | |
|---|---|---|---|---|
| 5,627,438 A | * | 5/1997 | Barrett | .......................... 318/139 |
| 5,839,533 A | | 11/1998 | Mikami et al. | |
| 5,915,801 A | | 6/1999 | Taga et al. | |
| 6,155,365 A | * | 12/2000 | Boberg | ...................... 180/65.25 |
| 6,459,980 B1 | | 10/2002 | Tabata et al. | |
| 6,502,652 B2 | * | 1/2003 | Rogg | .......................... 180/65.21 |
| 6,629,026 B1 | * | 9/2003 | Baraszu et al. | .................. 701/22 |
| 6,949,897 B2 | * | 9/2005 | Wakashiro et al. | ........... 318/139 |
| 7,493,980 B2 | * | 2/2009 | Hidaka | ....................... 180/65.25 |
| 7,673,714 B2 | * | 3/2010 | Soliman et al. | ........... 180/65.265 |
| 7,894,968 B2 | * | 2/2011 | Stroh et al. | ........................ 701/84 |
| 8,040,084 B2 | * | 10/2011 | Muta | .............................. 318/376 |
| 2002/0116101 A1 | * | 8/2002 | Hashiba et al. | .................. 701/22 |
| 2003/0190995 A1 | | 10/2003 | Aoki | |
| 2006/0006008 A1 | | 1/2006 | Brunemann et al. | |
| 2006/0195242 A1 | | 8/2006 | Yamamoto et al. | |

FOREIGN PATENT DOCUMENTS

JP     2000-23309     1/2000

OTHER PUBLICATIONS

How to Drive a Column Shift, 1 page printed from the Internet—Jun. 25, 2007, http://www.geocities.com/MotorCity/Factory/6952/ek3speed.htm How Sequential Gear Boxes Work, 3 pages printed from the Internet—Jun. 25, 2007, http://auto.howstuffworks.com/sequential-gearbox2.htm.

* cited by examiner

*Primary Examiner* — Bentsu Ro
*Assistant Examiner* — Thai Dinh
(74) *Attorney, Agent, or Firm* — Farjami & Farjami LLP

(57) ABSTRACT

The regenerative torque shifter is a system for electric/hybrid electric vehicles that includes a driver-operated control device mounted in the vehicle and a control unit linked to a motor controller. The driver sets a level of regenerative braking desired by manipulating the control device. Based on output from the control device, the control unit directs the motor controller to apply a corresponding level of regenerative braking action by varying the amount of load seen by the motor.

13 Claims, 2 Drawing Sheets

REGENERATIVE TORQUE SHIFTER

CROSS-REFERENCE TO RELATED APPLICATION

This application claims the benefit of U.S. Provisional Patent Application Ser. No. 60/935,985, filed Sep. 10, 2007.

BACKGROUND OF THE INVENTION

1. Field of the Invention

The present invention relates to the electric and hybrid vehicles, and more particularly, to a regenerative torque shifter that provides for manual control of the degree of regenerative braking by the driver of an electric or hybrid electric vehicle.

2. Description of the Related Art

Electric and hybrid electric vehicles are becoming more commonplace. Many of these vehicles include a system that automatically switches the electric motor into a generator as the vehicle is slowed, which provides regenerative braking. Such regenerative brake systems conserve energy so that batteries can be recharged from energy that would otherwise be dissipated as heat, thus increasing the range and energy efficiency of the vehicle. The amount of braking in such systems is either regulated automatically by the system, or statically by the operator.

A by-product of manual or semi-automatic transmissions found in internal combustion engine (ICE) driven vehicles is a process commonly referred to as "downshifting," generally referring to deceleration that occurs when the driver's foot is removed from the accelerator and resulting from friction and air pressure in the cylinders, as well as decreased flow of air-fuel mixture into the combustion chamber. Downshifting is a well-known and critical component in the high-performance driving world. Downshifting is used to reduce vehicle speed when entering turns to increase traction. In addition, downshifting reduces the amount of time the operator needs to move their foot from the accelerator to the brake to slow the vehicle down, a significant improvement in safety. Electric vehicles do not naturally incur this phenomena, and hybrid vehicles only to a limited extent, depending upon the configuration of the vehicle. It would be desirable to provide this downshifting feature in electric vehicles and hybrid vehicles to provide such vehicles with the same feel as an ICE vehicle.

Thus, a regenerative torque shifter solving the aforementioned problems is desired.

SUMMARY OF THE INVENTION

The regenerative torque shifter is a system for electric/hybrid electric motor driven vehicles that includes a driver-operated control device mounted in the vehicle and a control unit linked to a motor controller. The driver sets a level of regenerative braking desired by manipulating the control device. Based on output from the control device, the control unit directs the motor controller to apply a corresponding level of regenerative braking action by varying the amount of load seen by the motor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
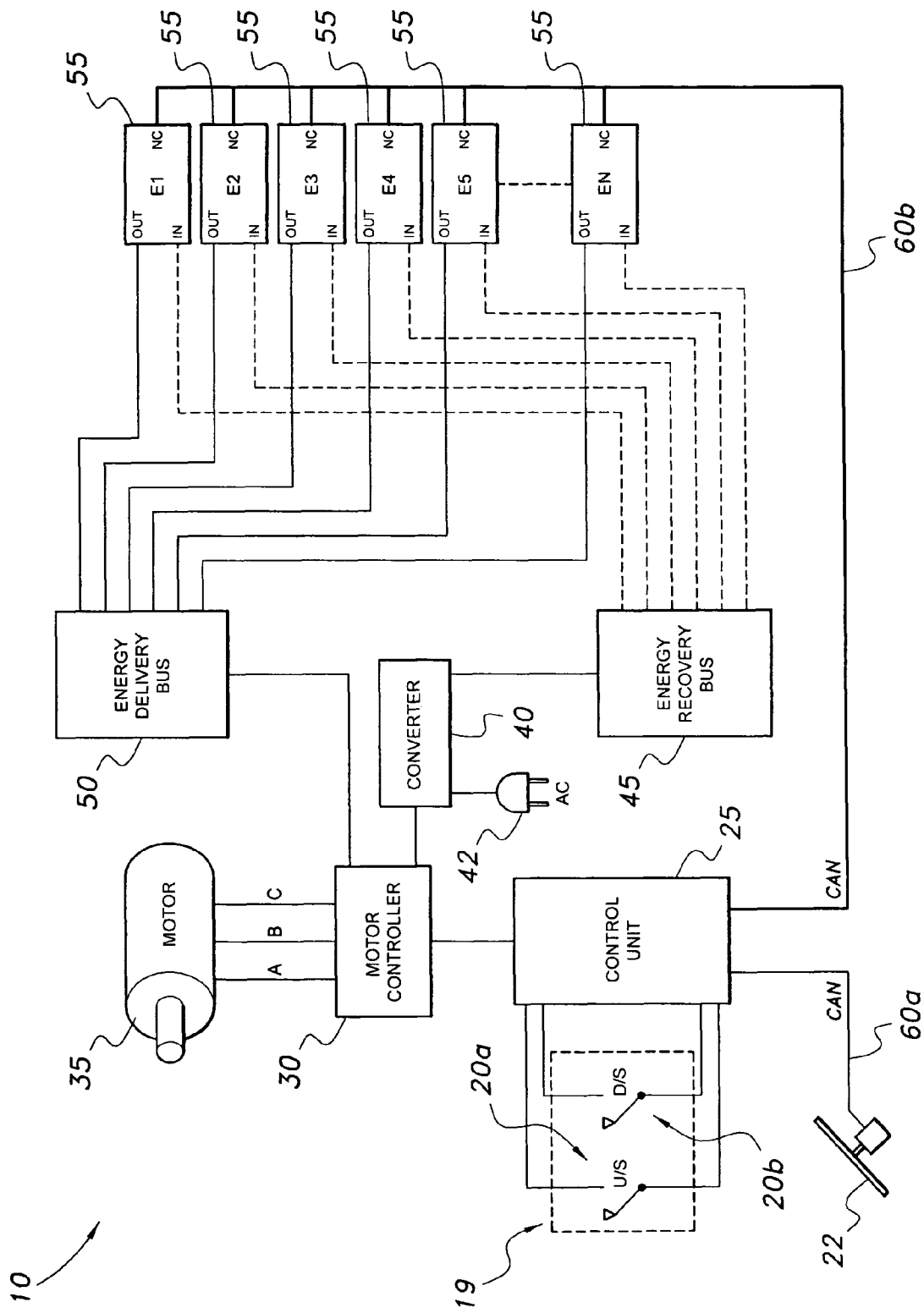
FIG. 1 is a block diagram of a regenerative torque shifter according to the present invention.
Figure 2:
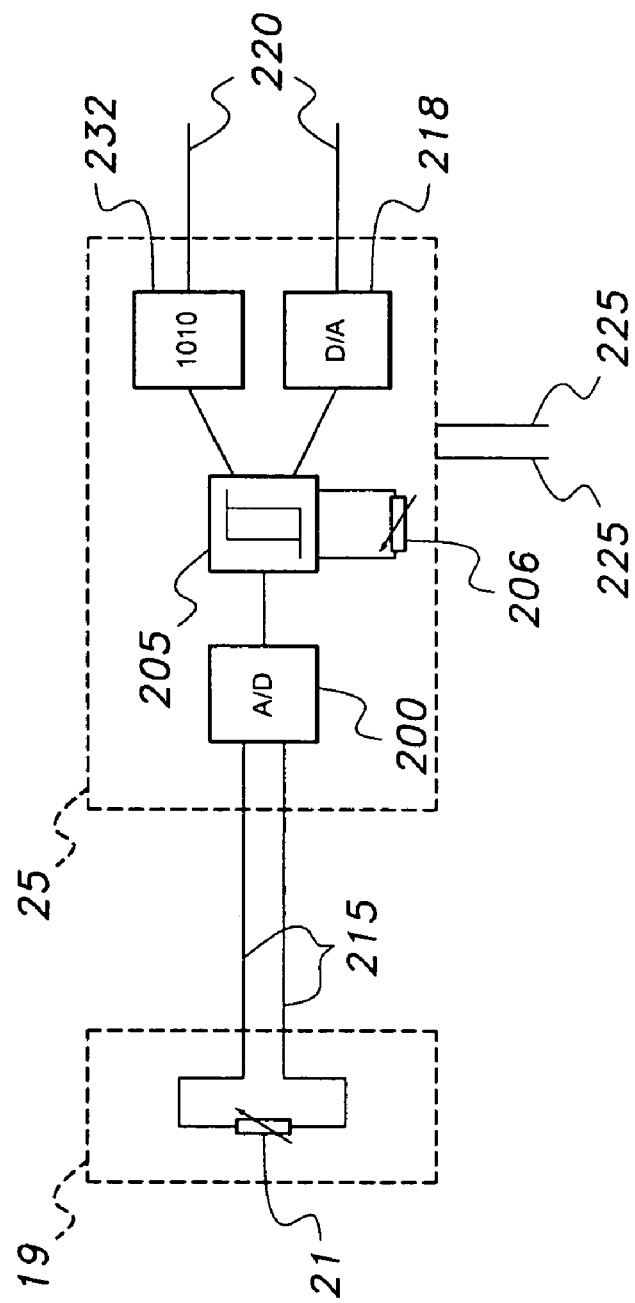
FIG. 2 is a block diagram of the hysteresis circuit of the regenerative torque shifter according to the present invention.

Referring to FIGS. 1 and 2, the present invention is a regenerative torque shifter, designated generally as 10 in the drawings, that is a system for vehicles (including hybrid vehicles) having an electric motor drive. The system includes at least one torque shift control device 19 mounted in a location accessible by the driver, and a control unit 25 connected to an electric vehicle motor controller 30. In real-time, the driver can dynamically set a level of regenerative braking desired by interacting with the torque shift control device 19. The control unit 25 senses state changes of the torque shift control device 19 and directs the electric motor 35 to generate a corresponding level of negative torque (as used herein, negative torque refers to a reduction in torque while the vehicle continues to move forward). While FIG. 1 shows an exemplary single motor and drive shaft, electric power plant 35 may be comprised of a plurality of motors. The control unit 25 has a hysteresis device 205 so that rapid changes applied to the torque shift control device 19 do not cause abrupt changes in speed.

An exemplary torque shift control device 19 may comprise at least one transducer that senses a driver parameter, such as the driver's touch. The transducer may be a resistive, capacitive, conductive or other type pressure sensitive device, a plunger type switch, a rotary type switch, or the like, and may generate pressure data, relative position data, or the like. This data from the torque shift control device 19 may be encoded as resistance, conductance, current, voltage, analog, or digital data depending on the sensor technology used.

For example, the torque shift control device 19 can be located in a conventional stick shift or gearshift selector location and/or on a steering wheel, steering column, joystick, door panel, dashboard, floorboard, or the like, of the vehicle. The torque shift control device 19 may be comprised of components that take the form of paddles, levels, toggles, buttons or similar controls. An exemplary torque shift control device 19 may have one or more paddles to support operations of system 10. In cases where one paddle is used, two operations positions, UP and DOWN may be provided. In cases where two paddles are used, one may provide a single function, UP, while the other may provide a single function, DOWN. More paddles may be positioned for operator comfort.

The torque shift control device 19 can also take a form suitable for mounting to handlebars for use in a motorcycle, scooter, moped, or other cycle style vehicle. Drivers/vehicle operators can manipulate the torque shift control device 19 with a conveniently located body part to set a level of regeneration with a high degree of resolution. The system 10 may be configured to respond to manipulations of torque shift control device 19 so that a regenerative braking level is increased based on either the time of activation (how long the paddle has been pressed) or number of activation cycles (how many times the paddle has been tapped). The longer the paddle is pressed, the more braking force is applied. Similarly, as the paddle is tapped repeatedly, the braking force is likewise stepped up.

The torque shift control device 19 may be wired or otherwise connected to control unit 25, which is capable of sampling information from the torque shift control device 19 in real-time. In this way, the control unit 25 can determine the level of regenerative braking desired by the driver. Once sampled, the control unit 25 applies a level of hysteresis via hysteresis device 205 in order to slow down the reaction time of the system 10. This is a safety feature, intended to protect the operator from harm or vehicle damage in the case the torque shift control device is engaged too quickly. The level of hysteresis is adjustable by way of a potentiometer 206 that is either integrated directly in the control unit 25, or remotely located in the vehicle where the operator has access to it.

The control unit 25 then performs mathematical calculations on the data to scale according to what the regenerative brake system expects to see. The control unit 25 may be responsive to analog encoded output formats, digitally encoded output formats, or some combination of both types of formats.

By manipulating the torque shift control device 19, the operator gains precision real-time dynamic control of negative torque generation of electric motor 35. In a vehicle equipped with the regenerative torque shifter 10, a driver can apply regenerative braking in a manner similar to the downshifting process found in conventional vehicles equipped with a manual or semi-automatic transmission. However, a vehicle equipped with the shifter 10 does not require the use, weight, and inefficiencies of a transmission.

By using the torque shift control device 19, regenerative braking can be applied in a manner closely matched to the driver's unique driving habits and road conditions, thereby making driving a safer, more enjoyable experience.

As shown in FIG. 1, the operating torque of electric engine 35 may be controlled by a throttle actuator (accelerator pedal) 22, and a torque shift control device 19, which is comprised of exemplary upshift actuator 20a, and downshift actuator 20b. Control unit 25 accepts signals from these actuators 22, 20a, and 20b to control motor controller 30. Control unit 25 may be configured to accept the actuator signals in the form of a stimulated analog voltage through, e.g., a resistive potentiometer, or in the form of digital messages via a network communication link, or by other means as known by those of ordinary skill in the art.

In the case of signals from accelerator pedal 22, the control unit 25 uses this information to determine a level of positive torque the driver desires in order to direct motor controller 30 to properly energize and drive the motor 35. Control unit 25 outputs control signals to motor controller 30 in response to the actuator signal inputs at control unit 25. The control unit 25 may be an analog and/or digital computing device capable of contemporaneously performing a variety of functions, such as conditioning, detecting and interpreting inputs from the torque shift control device 19, controlling motor controller unit 30, and controlling battery packs 55.

In the case where a driver releases the accelerator pedal 22, control unit 25 may be configured via electronic circuitry, software and/or firmware to direct the motor controller 30 to stop energizing the motor 35 for positive torque output and to begin applying a load to the motor 35 to create negative torque output (regenerative braking), as well as to recover energy from the system 10 during vehicle deceleration. The level of regenerative braking, usually a very mild braking effect to emulate normal "expected" vehicle operation, may be set by the system 10 based on various parameters, and/or by the driver through some static interface such as a potentiometer dial, switches, or the like.

Moreover, in addition to the default mild regenerative braking effect, the regenerative torque shifter 10 advantageously provides for dynamic real-time regenerative braking control via driver interaction with the torque shift control device 19.

When the control unit 25 detects a contact closure of the upshift switch 20a the control unit 25 will immediately decrease the braking level in response. Conversely, when the control unit 25 detects a contact closure of the downshift switch 20b, the control unit 25 will immediately increase the braking level in response.

The control unit 25 accomplishes this responsive decrementing or incrementing of braking level by varying the number of battery packs 55 that are connected to an energy recovery bus 45, thus changing the electric load on electric drive motor 35. Fidelity of control over the braking level is defined by the number of battery packs 55 in the system 10. Increasing the number of battery packs 55 in the system 10 increases the fidelity of regenerative braking control.

While all controller functions are illustrated in one unit 25, functions of the control unit 25 may alternatively be distributed across various hardware, firmware and/or software components of the system 10.

As shown in FIG. 2, torque shift control device 19 may employ a position encoder 21, the output of which is routed to an A/D converter 200 within control unit 25. The output of the A/D converter 200 is then routed to hysteresis device 205. A hysteresis level adjustment of hysteresis device 205 is provided by shunting hysteresis potentiometer 206. Output of the hysteresis device 205 is routed to a digital output encoder block 232 and an analog output converter block 218. Signals from both digital output encoder block 232 and analog output converter block 218 comprise regenerative braking commands and are routed via link 220 to motor controller 30 for processing thereof.

Motor controller 30 may comprise an inverter and may generate a plurality of phased power signals via a plurality of lines, such as lines A, B and C, to supply the appropriate torque/power commands to electric motor 35. Additionally, motor controller 30 may include an opto-coupled discrete interface to other portions of system 10, and may also include configurable analog, discrete, and pulse-width modulated (PWM) resources capable of interfacing with motor 35, converter 40, as well as legacy vehicle systems. The motor controller 30 is capable of power control over a plurality of elements of system 10 and may be configured to operate directly from legacy twelve-volt power sources. Responsive to the phased power outputs from motor controller 30, the electric engine 35 may develop positive torque, negative torque, or zero torque. While any number of phases may be utilized for a poly-phase electric drive motor in system 10, FIG. 1 illustrates motor controller 30 being configured for three-phase control to at least one three-phase motor, such as exemplary motor 35.

A power source for the motor controller 30 and motor 35 comprises at least one electric energy storage device 55, such as a battery or capacitor.

Exemplary electric energy storage device 55 may include a plurality of cores configured as a plurality of battery cell arrays. The cell arrays can be arranged in a predetermined number S arranged in serial by a predetermined number P arranged in parallel. Each set of S linked cells is defined to be a string. The cores of electric energy storage devices 55 receive power control from control unit 25 via communications network 60b.

Preferably, the cores of electric energy storage devices 55 have very low impedance, and are capable of operating safely at very high current levels so that the cores may release large amounts of energy into the system 10 without generating excessive heat or losing energy due to excessive heat buildup. Advantageously, the cores of electric energy storage device 55 may recover energy during regenerative braking of system 10 very fast without generating excessive heat or losing energy to excessive heat buildup.

The battery management system in each core of electric energy storage device 55 has integrated charging and monitoring electronics capable of measuring current, voltage and temperature, and can make autonomous decisions to manage its own basic operation.

As shown in FIG. 1, the plurality of electric energy storage devices 55 (E1 through EN) have outputs OUT that are each independently connected to an energy delivery bus 50. The energy delivery bus 50 may be comprised of a heavy gauge copper bus bar, a cable assembly, or similar power conduit. Output of the energy delivery bus 50 is routed to motor controller 30 to complete power delivery to the electric motor 35. Additionally, each electrical storage device 55 has an input IN and a network connection NC. Control unit 25 has network capability and, as shown in FIG. 1, accepts a controller area network (CAN) connection 60b from network connections NC of the electrical energy storage devices 55. It should be understood that a CAN connection to the control unit 25 is exemplary and that, as known by those of ordinary skill in the art, any other suitable control interface may be implemented.

Input port IN of each energy storage device 55 independently accepts a dedicated corresponding output from an energy recovery bus 45. The separate, bifurcated output ports OUT and input ports IN of each energy storage device 55 allows a small number of strings within each battery pack to be charged, and a large number of strings to be discharged.

A converter 40 interconnects a converter feed port of motor controller 30 to an input of energy recovery bus 45. Converter 40 may preferably be a highly efficient switch-mode device capable of accepting a wide range of AC voltage levels and frequencies generated by electric motor 35 and converting those varying levels and frequencies to a fixed DC level suitable for charging the energy storage devices 55. When the motor 35 has been commanded to provide a net negative torque, the motor 35 acts as a generator, supplying energy that is routed via feed port of motor controller 30 to converter 40.

Moreover, while the motor 35 is supplying negative torque, converter 40 converts a resultant alternating current (AC) from the motor 35 into direct current (DC) which is routed to selected energy storage devices 55 via energy recovery bus 45 for charging. The energy recovery bus 45 can be a heavy gauge copper bus bar, a cable assembly, or similar power conduit. Control unit 25 determines which of storage devices 55 are to be connected to receive energy from the recovery bus 45 and, via CAN 60b messages, activates the appropriate storage device input ports IN to receive charging energy. It is contemplated that charging instructions from control unit 25 may include a specific string or group of strings within energy storage devices 55 that are to be charged during a regenerative braking cycle. The CAN 60b is connected to bidirectional control ports of the energy storage devices 55 so that, in addition to controlling the energy storage devices 55, their configuration and status may be read by control unit 25.

Responsive to signals from shift actuators 20a and 20b, and accelerator actuator 22, control unit 25 determines how much regenerative braking should be applied and thereby via CAN 60b selects which of the electrical storage devices 55 are to become loads for charging. It should be noted that signals from accelerator pedal 22 may be routed to control unit 25 via a CAN 60a. Moreover, when motor 35 is idle, an electric plug 42 may be connected to the AC mains so that converter 40 can supply DC voltage to the energy recovery bus 45, which can be routed to inputs IN of energy storage devices 55 for charging.

It is to be understood that the present invention is not limited to the embodiment described above, but encompasses any and all embodiments within the scope of the following claims.

I claim:

1. A regenerative torque shifter system for a vehicle having a powertrain with an electric motor, the system comprising:
   a motor controller adapted for electrical connection to the electric motor;
   at least one energy storage device;
   an energy recovery bus electrically connected to the at least one energy storage device;
   a control unit electrically connected to a torque shifter, the motor controller, and the energy recovery bus, the control unit having a circuit for adjusting the motor controller to apply a negative torque to regulate regenerative braking by adjusting a load applied by the energy recovery bus responsive to operation of the torque shifter by a driver of the vehicle, whereby the torque shifter is adapted to be utilized to apply the negative torque to regulate the regenerative braking without requiring use of a transmission.

2. The regenerative torque shifter system according to claim 1, further comprising a hysteresis circuit for inhibiting abrupt changes in motor RPM when rapid changes are applied to the torque shift controller.

3. The regenerative torque shifter system according to claim 1, further comprising:
   an energy delivery bus electrically connected to the at least one energy storage device to the motor controller to supply power to the electric motor; and
   a converter electrically connected to the motor controller and the energy recovery bus, the converter supplying power to the energy recovery bus.

4. The regenerative torque shifter system according to claim 1, wherein the torque shifter comprises at least one transducer, the at least one transducer sensing a driver parameter, and means for encoding the driver parameter into an electrical signal for input into the control unit.

5. The regenerative torque shifter system according to claim 1, wherein said circuit for adjusting the motor controller is configured for increasing the regenerative braking level of the system based on the activation duration of the torque shifter.

6. The regenerative torque shifter system according to claim 1, wherein said circuit for adjusting the motor controller is configured for increasing the regenerative braking level of the system based on a number of activation cycles of the torque shifter.

7. The regenerative torque shifter system according to claim 1, wherein the control unit comprises means for applying a mathematical calculation on its inputs, the calculation scaling the input data to achieve a predetermined regenerative braking effect.

8. The regenerative torque shifter system according to claim 1, further comprising a throttle actuator electrically connected to the control unit.

9. The regenerative torque shifter system according to claim 8, further comprising a controller area network, the controller area network establishing data communication between the throttle actuator and the control unit.

10. The regenerative torque shifter system according to claim 9, wherein the controller area network establishes data communication between the at least one energy storage device and the control unit.

11. The regenerative torque shifter system according to claim 1, wherein the motor controller includes means for generating configurable analog, discrete, and pulse-width modulated (PWM) signals interfacing with the motor and the converter.

12. The regenerative torque shifter system according to claim 1, wherein said at least one energy source comprises a plurality of battery packs, the system further comprising a charging circuit connected to each of the battery packs, the control unit having a circuit for selectively determining the number of battery packs to be charged and selectively connecting and disconnecting the battery packs to the energy recovery bus, thereby selectively connecting and disconnecting the battery packs to the charging circuit, responsive to driver actuation of the torque shifter in order to vary the load applied to the motor to regulate the level of regenerative braking.

13. The regenerative torque shifter system according to claim 12, wherein the at least one energy storage device further comprises a battery management system in each core, the battery management system providing integrated charging, monitoring, and autonomous battery management decisions based on current, voltage and temperature measurements within the storage device.

* * * * *